United States Patent [19]
Bauer

[11] Patent Number: 6,021,743
[45] Date of Patent: Feb. 8, 2000

[54] STEAM GENERATOR

[75] Inventor: Günter Bauer, Herzogenaurach, Germany

[73] Assignee: Siemens Aktiengesellschaft, Munich, Germany

[21] Appl. No.: 09/028,236

[22] Filed: Feb. 23, 1998

Related U.S. Application Data

[63] Continuation of application No. PCT/DE96/01490, Aug. 8, 1996.

[30] Foreign Application Priority Data

Aug. 23, 1995 [DE] Germany .......................... 195 31 027

[51] Int. Cl.⁷ ...................................................... F27D 9/00
[52] U.S. Cl. .............................. 122/4 D; 122/22; 110/347
[58] Field of Search .................................. 122/4 D, 4 R, 122/22; 110/345, 346, 347

[56] References Cited

U.S. PATENT DOCUMENTS

| | | | |
|---|---|---|---|
| 3,823,693 | 7/1974 | Bryers et al. ........................... | 122/4 D |
| 3,863,606 | 2/1975 | Bryers et al. ........................... | 122/4 D |
| 4,250,820 | 2/1981 | Lautenschlager ...................... | 110/347 |
| 4,438,709 | 3/1984 | Borio et al. ............................. | 110/347 |
| 4,442,783 | 4/1984 | Pajonas et al. ......................... | 110/347 |
| 4,476,816 | 10/1984 | Cannon et al. ......................... | 110/347 |
| 4,501,204 | 2/1985 | McCartney et al. ................... | 110/347 |
| 4,528,918 | 7/1985 | Sato et al. ............................... | 110/347 |
| 4,532,873 | 8/1985 | Rivers et al. ........................... | 110/347 |
| 5,158,449 | 10/1992 | Bryan et al. ............................ | 110/245 |
| 5,428,950 | 7/1995 | Tomlinson et al. .................... | 60/39.02 |

*Primary Examiner*—Mark Paschall
*Assistant Examiner*—Jiping Lu
*Attorney, Agent, or Firm*—Herbert L. Lerner; Laurence A. Greenberg

[57] ABSTRACT

A steam generator achieves an especially high efficiency when biomass is used as a fuel. The steam generator contains a first combustion chamber for generating a gaseous working medium by burning a first fuel and a second combustion chamber for burning a second fuel. The second combustion chamber is connected downstream of the first combustion chamber in flow direction of the working medium. Bituminous coal may be fed as the first fuel to the first combustion chamber and/or biomass, in particular straw, may be fed as the second fuel to the second combustion chamber. The working medium generated in the first combustion chamber during operation of the steam generator serves as combustion air in the second combustion chamber.

4 Claims, 1 Drawing Sheet

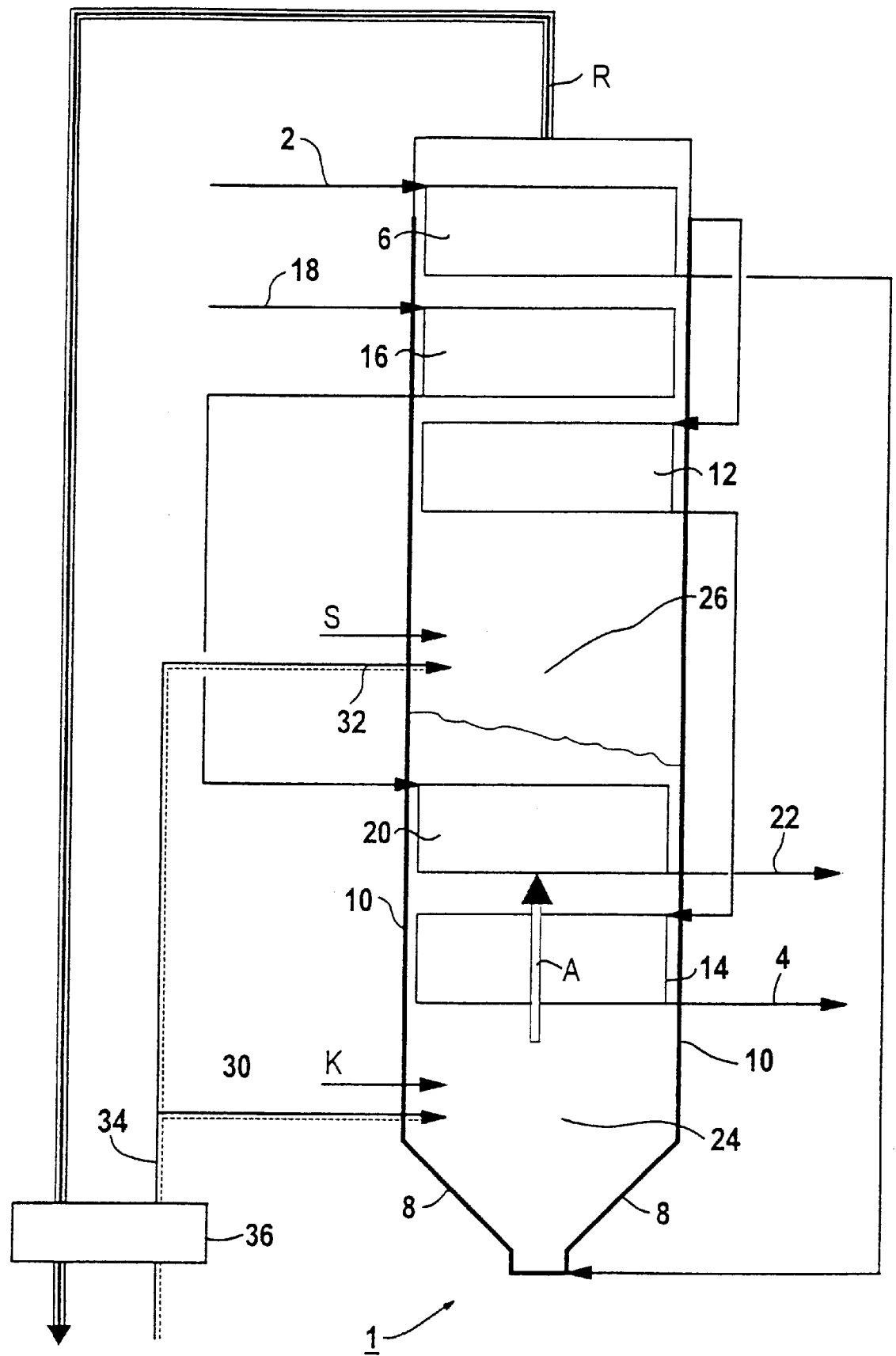

STEAM GENERATOR

CROSS-REFERENCE TO RELATED APPLICATION

This application is a continuation of International Application Ser. No. PCT/DE96/01490, filed Aug. 8, 1996, which designated the United States.

BACKGROUND OF THE INVENTION

FIELD OF THE INVENTION

The invention relates to a steam generator having a combustion chamber for generating a working medium by burning a fuel.

In a fossil-fired steam power plant, the energy content of the fuel is converted into a technologically utilizable form of energy. In the process, a hot gas is generated as a working medium by burning the fuel and the heat content of the hot gas is utilized in order to completely or partly evaporate and/or superheat water in an evaporator. The resulting steam is directed to a steam turbine, where it expands and in the process transmits energy to a generator system.

In such a case, fossil energy carriers in the form of heating oil, natural gas or even coal are used in particular as the fuel. A common feature of those fuels is that they release carbon dioxide ($CO_2$) during their combustion. The carbon that was converted as a result was combined in the fuel for a considerable length of time before the combustion and was thus extracted from the carbon-dioxide balance of the earth's atmosphere. The combustion of those fuels therefore contributes to an increase in the current global $CO_2$ level. It is also of particular importance, in particular in view of the greenhouse effect caused thereby, i.e. continuous warming of the earth's atmosphere, to use regenerable energy carriers or energy carriers having a comparatively short carbon-dioxide cycle, such as biomass for example, during the generation of steam. Although carbon dioxide ($CO_2$) is likewise emitted to the atmosphere during the combustion of biomass, such as straw for example, the carbon forming the basis of that carbon dioxide in general was only incorporated into the biomass a short time before, so that the combustion of the biomass results in no significant increase in the average carbon-dioxide level.

Therefore, straw which is used as a biomass in particular has proven to be an especially attractive fuel for steam generation. However, it proves to be problematic in the construction of a steam generator for straw as a fuel that intensified corrosion of the metallic heating surfaces of the steam generator starts at steam temperatures above about 470° C. due to materials contained in the straw, such as chlorine and potassium, for example. However, in order to be able to operate a steam generator at a sufficiently high efficiency for economical operation, steam temperatures of more than 500° C. are required.

Published European Patent Application 0 206 340 A2, corresponding to U.S. Pat. No. 4,681,065, and U.S. Pat. No. 3,884,193, respectively disclose a steam generator having a first combustion chamber for generating a working medium by burning a first fuel and having a second combustion chamber for burning biomass as a fuel. In the case of such steam generators, the second combustion chamber in each case is connected downstream of the first combustion chamber in the flow direction of the working medium.

SUMMARY OF THE INVENTION

It is accordingly an object of the invention to provide a steam generator, which overcomes the hereinafore-mentioned disadvantages of the heretofore-known devices of this general type and with which a high efficiency can be achieved without starting intensified corrosion, when biomass is used as the fuel.

With the foregoing and other objects in view there is provided, in accordance with the invention, a steam generator, comprising a first combustion chamber for generating a working medium by burning a first fuel, the first combustion chamber having a flue-gas region; a second combustion chamber for burning a second fuel, the second combustion chamber connected downstream of the first combustion chamber in flow direction of the working medium, and the second combustion chamber having a flue-gas region; a first superheater heating surface disposed in the flue-gas region of the second combustion chamber; and a second superheater heating surface connected downstream of the first superheater heating surface and disposed in the flue-gas region of the first combustion chamber.

Such a steam generator can be adapted in an especially flexible manner to varying requirements during the use of different fuel types. It is only in that way that it is ensured that the special requirements during the combustion of biomass for avoiding corrosion on the heating surfaces of the steam generator can be taken into account while still achieving a high temperature level in the steam generator required for a high efficiency. The superheater heating surfaces are provided in order to particularly reliably ensure the high steam temperature level required for a high efficiency. Through the use of the superheater heating surfaces in particular, the operating parameters of the steam generator can be adapted in an especially flexible manner to the flue-gas temperature level of the first and second combustion chambers.

In accordance with another feature of the invention, coal, in particular bituminous coal, can be fed as fuel to the first combustion chamber and/or biomass, in particular straw, can be fed as fuel to the second combustion chamber. It is thereby ensured that a steam temperature of, for example, more than 550° C., which is a steam temperature that is required for a high efficiency, can be achieved in the region of the first combustion chamber, and the steam temperature is less than about 470° C. in the region of the second combustion chamber fired with biomass, in order to avoid high-temperature corrosion. In this way, the biomass, in particular the straw, can be utilized as a main fuel for producing a steam temperature of about 470° C., with the steam-temperature level being raised from about 470° C. to more than 550° C. by the coal firing merely like an auxiliary firing.

In accordance with a further feature of the invention, in order to provide an especially high efficiency of the steam generator, during operation thereof the working medium generated in the first combustion chamber serves as combustion air in the second combustion chamber. To this end, the first combustion chamber can expediently be operated with excess air, in particular with an excess-air ratio of the actually supplied air quantity, to the air quantity required for stoichiometric combustion, of about 2.5. In addition, during operation of the first combustion chamber with excess air, the flue-gas temperature of the working medium can be lowered to about 1050° C. so that ash fusion and resulting contamination of heating surfaces are avoided.

In accordance with an added feature of the invention, in order to ensure especially favorable heat transfer during the steam generation, the outer walls of the steam generator expediently contain a number of steam-generator tubes.

Depending on the operating pressure, the steam generator in this case may be constructed as a once-through steam generator, as a forced-circulation steam generator or as a natural-circulation steam generator.

In accordance with an additional feature of the invention, to provide a further improvement in efficiency, a heat exchanger for preheating air by heat exchange with flue gas generated during the combustion is connected in an air-supply line connected to the first and/or the second combustion chamber.

The advantages obtained with the invention are in particular that, by connecting the second combustion chamber downstream of the first combustion chamber on the working medium side, it is possible to use biomass as a main fuel, but nonetheless a high efficiency of the steam generator is ensured while avoiding high-temperature corrosion on the heating surfaces. In addition, the use of bituminous coal as an auxiliary fuel, in particular as compared with alternative auxiliary fuels such as, for example, the pure fuels heating oil or natural gas, ensures economical operation of such a steam generator.

In accordance with a concomitant feature of the invention, the first superheater heating surface generates steam at a temperature of at most a maximum of about 470° C.

Other features which are considered as characteristic for the invention are set forth in the appended claims.

Although the invention is illustrated and described herein as embodied in a steam generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a diagrammatic, elevational view of a steam generator according to the invention.

DESCRIPTION OF THE PREFERRED EMBODIMENTS

Referring now in detail to the single figure of the drawing, there is seen a steam generator 1 which is connected in a water/steam circuit of a non-illustrated steam turbine through a feedwater supply 2 and through a steam-side outlet 4 of the steam generator 1. To this end, the feedwater supply 2 is connected through a preheater or economizer 6 to a number of steam-generator tubes 8 which are part of outer walls 10 of the steam generator 1. The steam-generator tubes 8 are connected on the outlet side to a first high-pressure superheater 12 having a superheater heating surface. The latter is connected on the outlet side to a second high-pressure superheater 14 having a superheater heating surface, which leads into the steam-side outlet 4 of the steam generator 1.

In order to provide a steam turbine having a plurality of pressure stages, a first reheater 16 having a superheater heating surface is additionally disposed in the steam generator 1. This reheater 16 is connected on the inlet side to a steam inlet 18 and on the outlet side to a second reheater 20 having a superheater heating surface which is likewise disposed in the steam generator 1 and leads into a steam outlet 22. Depending on the construction of the steam turbine, the steam inlet 18 may be connected, for example, to a steam outlet of a first or high-pressure part of the steam turbine, and the steam outlet 22 may be connected to a steam inlet of a second or intermediate-pressure or low-pressure part of the steam turbine.

The steam generator 1 contains a first combustion chamber 24 for generating a working medium A by burning a first fuel K. In this case, the first fuel K is preferably coal, in particular bituminous coal. Furthermore, the steam generator 1 contains a second combustion chamber 26, which is disposed or connected downstream of the first combustion chamber 24 in the direction of flow of the working medium A, for burning a second fuel S. In this case, the latter is preferably biomass, in particular straw. In this case, the combustion chambers 24 and 26 are disposed in such a way that the second high-pressure superheater 14 and the second reheater 20 are disposed in a flue-gas region of the first combustion chamber 24, and that the first high-pressure superheater 12 and the first reheater 16 are disposed in a flue-gas duct of the second combustion chamber 26.

An air-supply line 30 connected to the first combustion chamber 24, as well as an air-supply line 32 connected to the second combustion chamber 26, are fed from a common air-supply line 34. The air-supply line 34 is connected in a secondary side of a heat exchanger 36. A primary side of the heat exchanger 36 is connected in an exhaust-gas flow of exhaust gas or flue gas R generated during the combustion. The heat exchanger 36 therefore serves as air preheater.

During operation of the steam generator 1, bituminous coal is fed as the fuel K to the first combustion chamber 24. In order to avoid ash fusion and resulting contamination of heating surfaces, the combustion of the fuel K is effected in such a way that the temperature of the working medium A generated during the combustion, in the region of the second high-pressure superheater 14, is about 1050° C. To this end, the fuel K in the first combustion chamber 24 is combusted with excess air, in particular at an excess-air ratio of about 2.5. A portion of the heat content of the working medium A is transferred through the steam-generator tubes 8 to a water/steam mixture flowing through the latter. A further portion of the heat content of the working medium A is transferred through the second high-pressure superheater 14 and the second reheater 20 to the steam flowing through them in such a way that the steam temperature needed to achieve a high efficiency is about 550° C. The working medium A, which is thus cooled down to about 550° C., is then fed as combustion air to the second combustion chamber 26. In this case, the second combustion chamber 26 may be separated from the flue-gas region of the first combustion chamber 24 for straw firing, for example by a grate.

In addition to the working medium A, biomass, in particular straw, is fed to the second combustion chamber 26 as the second fuel S, and further combustion air is fed to the second combustion chamber 26 through the air-supply line 32 if required. The fuel S is burned in the second combustion chamber 26 in such a way that the resulting flue gases have a temperature of about 850 to 880° C., after heat emission to the water/steam mixture carried in the steam-generator tubes 8. At such a temperature, the use of various biomasses as the fuel S is possible without excessive contamination of the heating surfaces occurring due to ash fusion.

A portion of the heat content of the flue gas R is transferred through the first high-pressure superheater 12, the first reheater 16, the steam-generator tubes 8 as well as the economizer 6, to water or steam carried therein. In the process, the steam temperatures do not exceed 470° C., so that high-temperature corrosion of the heating surfaces does not occur even when biomass is used as the second fuel S. The flue gas R cools down in the process to about 350° C. The remaining portion of the heat content of the flue gas R is transferred through the air preheating heat exchanger 36 to the combustion air fed to the first combustion chamber 24 and/or the second combustion chamber 26.

Therefore, in such a steam generator 1, the use of biomass, in particular straw, as a main fuel for generating steam temperatures up to about 470° C. is possible. In this case, the corrosion of the heating surfaces is slight, so the steam generator 1 has a particularly long service life. In addition it is possible to achieve steam temperatures of more than 550° C., which are especially favorable for high efficiency, by connecting the first combustion chamber 24 upstream.

I claim:

1. A steam generator, comprising:

a first combustion chamber for generating a working medium by burning coal as first fuel, said first combustion chamber having a flue-gas region;

a second combustion chamber for burning bromass as a second fuel, said second combustion chamber connected downstream of said first combustion chamber in flow direction of the working medium, and said second combustion chamber having a flue-gas region;

said first and second combustion chambers each having an outer wall formed by steam-generator tubes;

a first superheater heating surface disposed in said flue-gas region of said second combustion chamber; and a second superheater heating surface connected downstream of said first superheater heating surface and disposed in said flue-gas region of said first combustion chamber.

2. The steam generator according to claim 1, wherein the working medium generated in said first combustion chamber serves as combustion air in said second combustion chamber during steam generator operation.

3. The steam generator according to claim 1, including an air-supply line connected to at least one of said combustion chambers, and a heat exchanger disposed in said air-supply line for preheating air by heat exchange with flue gas generated during combustion.

4. The steam generator according to claim 1, wherein said first superheater heating surface generates steam at a temperature of at most a maximum of about 470° C.

* * * * *